Jan. 14, 1930. T. A. BRYSON 1,743,753
CENTRIFUGAL MACHINE
Filed July 8, 1921 2 Sheets-Sheet 2

T. A. Bryson Inventor
By John D. Morgan Attorney

Patented Jan. 14, 1930

1,743,753

UNITED STATES PATENT OFFICE

TANDY A. BRYSON, OF TROY, NEW YORK, ASSIGNOR, BY MESNE ASSIGNMENTS, TO TOLHURST MACHINE WORKS, INC., OF TROY, NEW YORK, A CORPORATION OF NEW YORK

CENTRIFUGAL MACHINE

Application filed July 8, 1921. Serial No. 483,253.

The invention relates to centrifugal extractors and more particularly to the mounting, structure and driving connections of the basket, and the driving mechanism therefor.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1:
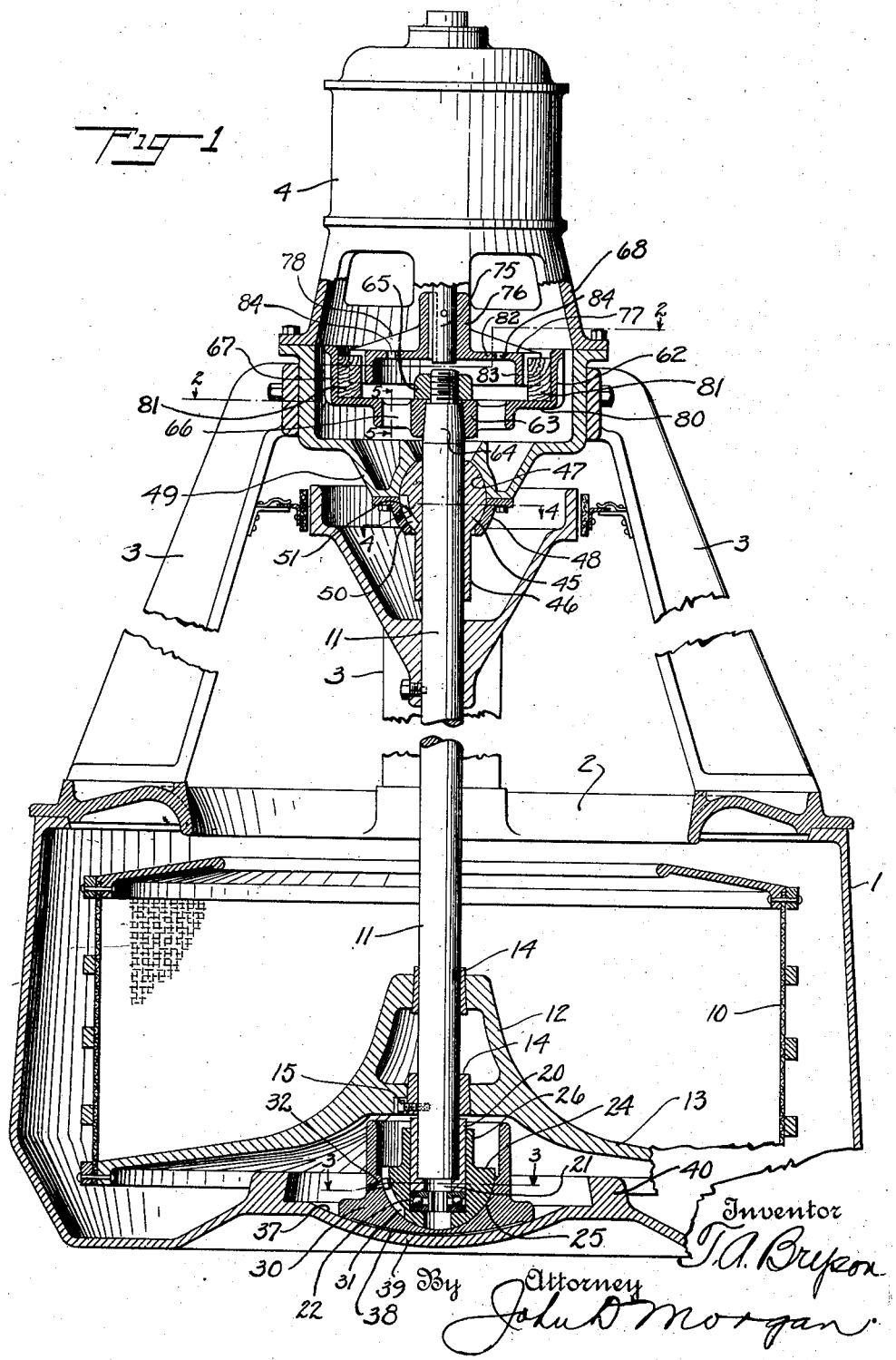
Fig. 1 is a central vertical section, with parts broken away and parts in elevation, of a centrifugal extractor constructed in accordance with the invention.

The invention is shown applied to a centrifugal extractor of the self-balancing type, that is, an extractor wherein the basket shaft is supported at its lower end in a step or cup bearing, on which bearing the shaft is not only free to rotate about its own center but is also free to gyrate due to unbalanced loads in the basket.

The invention comprises primarily a new form of direct driving connection between such a gyrating basket shaft and the shaft of an electric motor, which in connection with such a drive permits the basket shaft to have the requisite degree of both vertical and gyratory motion to compensate for the unbalanced load in the basket.

More in detail, a centrifugally operated friction clutch drive is provided, connecting the electric motor shaft directly with the basket shaft or spindle, while permitting the above described motion of the basket shaft, and also providing slippage in the drive, to provide for conditions of efficient and safe motor operation, especially during the taking on of the load and during acceleration under load, and also while running at low speed, as in discharging the basket.

In connection and cooperation with the foregoing, a novel and improved mounting, or bottom bearing and top bearing, for the basket shaft is provided, although the various features of the invention could be used independently of each other, and also with certain other kinds or types of extractors. It will be understood that the preceding and the succeeding description as well are explanatory and not restrictive of the invention.

Referring now in detail to the embodiment of the invention illustrated by way of example in the accompanying drawings, a basket casing 1 is provided, which may be of any convenient or usual form, said casing being provided with the usual or other convenient top opening 2, for purposes of loading the basket, inspection of the load and the like. Mounted on the casing 1 are a plurality of upwardly extending arms or pillars 3, upon which the motor 4, the top basket shaft bearing and the driving connections or mechanism are conveniently mounted.

Referring first in detail to the bottom support or bearing, the basket 10 is fixed on a shaft 11, in any suitable manner, and as shown an internal hub 12 is formed centrally of and extending upwardly from the basket floor 13. This hub is centrally apertured to make a taper fit over conically shaped sleeves 14 fixed on the basket shaft 11. A bolt 15 may be employed to hold the sleeve 14 on shaft 11 and to hold the basket in angular fixed relation to rotate with the shaft 11.

In the present preferred form of step bearing or bottom support for the basket shaft 11, the lower end of the shaft is fitted closely within a sleeve 20, which sleeve is provided at its bottom end with an opening 21, which may be a part of a lubricating system (not shown) of the machine. The bottom end of sleeve 20 is supported, free to rotate, upon a ball or roller bearing 22, which bearing is in turn supported in member 24, which is of hemispherical or substantially hemispherical conformation on its outer and under surface. The member 24, more in detail, has its interior cylindrically shaped vertically, and within this cylindrical opening the sleeve 20 is free to rotate. The bottom exterior surface 25 of the member 24 is of substantially hemispherical form, and has an upwardly projecting annular flange or sleeve 26, of less exterior diameter than the member 24 and fitting loosely about the sleeve 20. The shaft 11 and its sleeve 20 thus rest rotatably upon and within the hemispherical member 24. The member 24 may for convenience be called a ball support for the basket shaft or spindle.

From the foregoing it will be clear that the basket shaft 11 is free to rotate relatively to the ball support 24, but that any gyratory or eccentric motion of the basket shaft or spindle 11 will be imparted to the ball support 24. The ball support 24 is mounted to permit of this gyratory motion.

In the embodied form of said mounting, the ball support 24 rests upon its lower hemispherical part, and fits snugly within the correspondingly hemispherical or substantially hemispherical bottom interior portion of a member 30, which may be styled, as a matter of convenience, a cup. The cup 30 has its upper portion of substantially cylindrical form, and preferably of somewhat larger diameter than the ball support 24. The bottom of the cup 30 is of general spherical form, and rests upon a similarly shaped support, to permit of gyratory movement of the cup with the basket shaft, as will be later described. Means are provided for preventing relative rotary movement between the ball support 24 and the cup 30, but permitting angular or rocking motion therebetween, during the gyration or eccentric movement of the basket shaft or spindle 11. To prevent this relative rotary movement, a groove 31 is cut in the spherical exterior surface of the ball support 24 and a bolt 32 is screwed into the interior spherical surface of the cup 30 with the head thereof within the slot 31 in the ball support 24. Thus the ball support 24 and the cup 30 do not rotate with the basket shaft 11, but do move therewith during its gyratory or vibrational movement due to the unbalanced load in the basket.

In the embodied form of support for the cup 30 to permit the movement just described, the cup member 30 is supported or rests upon a member 39, having an internal spherical surface 37 of the same radius as the bottom of the cup 30. The center of the sphere of which the spherical surface 37 is a part is located well below the point of suspension of the basket. The exterior bottom surface of the cup is provided preferably with one or more lubricating spaces 38. The member having the spherical supporting surface 37 may be for convenience termed the saucer 39, and may be fixed to or constitute a part of the bottom of the casing 1. A rim 40 is preferably provided about the saucer 39 to retain the lubricating oil and to prevent splashing.

It will be understood that in this type of machine with the usual untrimmed or unbalanced basket loads, smooth and efficient operation of the extractor is impossible unless the rotating basket shaft is permitted to vibrate or to have circular eccentric motion to an extent necessary to allow the axis of rotation of the basket at any given instant to pass through the center of gravity of the loaded basket. In this operation of the machine, the cup 30 does not remain stationary upon the supporting surface 37 of the saucer 40, but may slide thereover following a curved path under the gravitational and frictional resistance offered by the outwardly and upwardly curved sides of the concave interior 37 of the saucer.

In the embodied form of upper bearing for the basket shaft or spindle 11 included in the present invention, there is provided a bearing which allows for the gyratory motion of the shaft 11 as already described and also for the resultant longitudinal vertical motion of the shaft. In said embodied form, the shaft 11 is carried in a ball and socket bearing, within which is the coincident center of rotation and gyration of the shaft 11.

As embodied, the shaft 11 is journaled in an internally cylindrical, and outwardly spherical, bearing member 45, which is shown provided with a downwardly projecting cylindrical sleeve 46 encircling the shaft 11. The cylindrical bearing member 45 is rotatably supported within an internally spherical socket or support 47, which, as constructed, comprises a member 48 which constitutes the lower part of the socket and which is bolted to a hollow casting 49. The lower part of casting 49 constitutes the upper part of the spherical socket 47, and the entire casting is supported upon the upper end of the arms or pillars 3.

The spherical member 45 is held against rotation with the shaft 11, while gyratory or angular movement between the ball 45 and the socket 47 is permitted. To effect this, as embodied, a curved slot 50 is formed in the ball 45 and a screw bolt 51 is screwed into socket member 48, with the head thereof projecting into the slot 50, thus holding the ball 45 against rotation with the shaft 11, but permitting oscillatory or vibratory movement of the ball and shaft together within the socket. The screw head 51 has its corners rounded and the slot 50 is somewhat wider than the head, so that the shaft 11 is free to move in any direction. The angular movement of the shaft to be accommodated is ordinarily quite small, being about three degrees. The shaft 11 is free for longitudinal movement relatively to the socket.

It will be understood from the foregoing that when the basket and its shaft 11 gyrate in the saucer 40 that, due to the spherical surface of the saucer, the shaft 11 will have a slight longitudinal or vertical movement within the top bearing. The center of gyration or oscillation will still be substantially at the center of the ball 45, as it rocks or vibrates in response to the movements of the basket.

In accordance with certain features of the invention, a centrifugally operating friction drive is provided directly between the motor and the basket shaft having the motions described. As embodied, a clutch drum 62 is fixed to the upper end of the basket shaft or spindle 11 in any suitable manner, and as shown, the hub 63 of the clutch drum is internally beveled to fit the beveled top end 64 of the shaft, a nut 65 being screw-threaded onto the end of the shaft to hold the clutch in position. The clutch is provided with a plurality of radial arms 66, with a flat annular part 80, and with an annular external rim 67 perpendicular to the part 80, which rim constitutes the driving surface of the clutch drum. There is sufficient play between the several clutch elements to allow for the longitudinal and gyratory movements of the shaft.

The motor 4 has its casing mounted on a pedestal 68, which is bolted to and supported by the top of the casting 49, which casting is supported by the top ends of the pillars 3. To the downwardly extending end 75 of the shaft of the motor 4 is fixed a hub 76 of a circular driving member 77, which is located within the upper part of the clutch drum 62 so as to be in operative relation to the rim 67 thereof. The member 77 comprises a flat circular horizontal disc 82 with a downwardly extending annular flange 83, and with vanes or arms 78, extending radially outwardly from the hub 76 and projecting beyond the external face of the flange toward the internal face of the annular rim 67 of the clutch drum, and designed to cooperate with the loose, centrifugally operated friction members.

Resting loosely upon the flat circular portion 80 of the clutch drum are a plurality of segmental members 81, preferably of wood or fiber or other frictional material. These segmental members 81 lie loosely between the annular flange 83 of the driving member and the rim 67 of the driven member, and are of a length to fit loosely between the vanes 78 of the driving member 77.

When the motor shaft 75 rotates, the friction members 81 are carried around in a circular path by the vanes 78 and are impelled outwardly by centrifugal force. For a time they will slip along the interior surface of the rim 67, but as the centrifugal pressure increases with the speed of rotation of the motor shaft, the friction pieces will slip less and less on the rim 67 and finally will bring it up to speed. The present invention provides such a drive for a shaft having gyratory and longitudinal movement.

Figure 2:
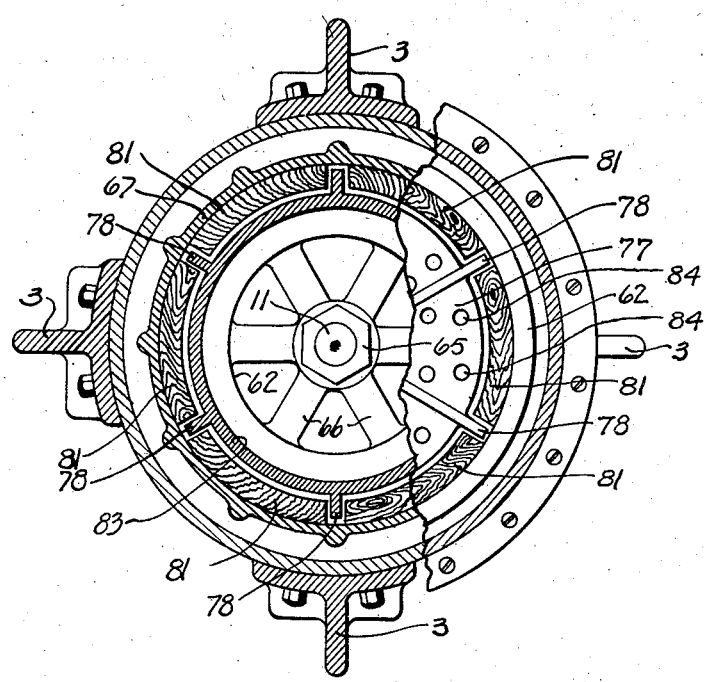
Fig. 2 is a horizontal section, greatly enlarged, taken on the line 2—2 of Fig. 1, showing the drive between the motor shaft and the basket shaft.
Figure 3:
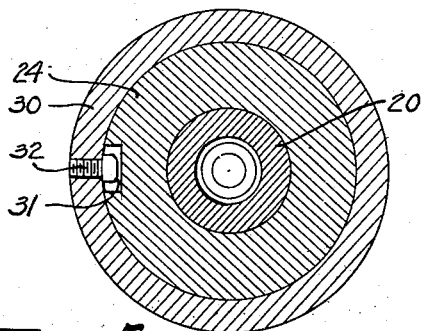
Fig. 3 is a horizontal section, greatly enlarged, taken on the line 3—3 of Fig. 1, showing certain features of the bottom or step bearing for the basket shaft.
Figure 4:
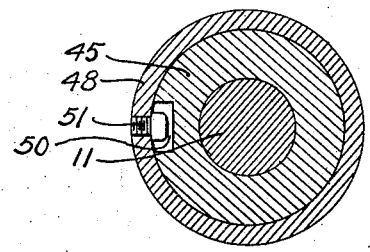
Fig. 4 is a horizontal section, greatly enlarged, taken on the line 4—4 of Fig. 1, and showing the ball and socket bearing for the upper end of the basket shaft.
Figure 5:
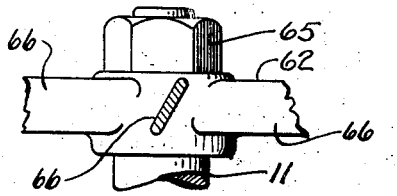
Fig. 5 is a fragmentary detail in elevation, greatly enlarged, and showing one of the clutch spiders in section on line 5—5 of Fig. 1.

In accordance with one feature of the invention, means are provided for ventilating the basket shaft bearing and the lower motor shaft bearing, and preferably this is effected by the rotation of the driving mechanism. In the preferred embodiment (see Figs. 1, 2 and 5), the arms 66 of the clutch drum 62 are not vertical, but are inclined in position and flat in form, as is best shown at the front of Fig. 5. Thus by the rotation of 62 a current of air is created through the openings between the arms 66. This is effective in preventing the transmission of heat from the friction surface of the clutch to the basket shaft and its top bearing.

In the embodied form of means for ventilating and cooling the lower motor bearing (Figs. 1 and 2) apertures 84 are formed in the disc 82 of the member 77, and the radial arms 78 act as fan blades to provide an air current to ventilate and cool the lower motor bearing.

The invention in its broader aspects is not limited to the specific mechanisms shown and described but departures may be made therefrom within the scope of the acompanying claims without departing from the principles of the invention and without sacrificing its chief advantages.

What I claim is:—

1. A centrifugal machine including in combination a basket, a rotatable basket shaft mounted for gyratory movement, means for rotating said shaft including a motor normally in alignment with said shaft, a centrifugally operated friction clutch connecting said motor directly with said basket shaft and including a plurality of radially movable friction clutch members, and a curved bearing surface at the lower end of said basket shaft supporting the basket shaft and clutch members and moving said shaft and clutch members upwardly axially of said shaft upon gyratory movement of the latter, and tending to bring said basket shaft and clutch members to normal position by downward movement axially of said shaft.

2. A centrifugal machine including in combination a basket, a rotatable basket shaft mounted for gyratory movement, means for rotating said shaft including a motor normally in alignment with said shaft, a centrifugally operated friction clutch connecting said motor directly with said basket shaft and including a plurality of radially movable friction clutch members and cooling and supporting spider arms, and a curved bearing surface at the lower end of said basket shaft supporting the basket shaft and clutch members and moving said shaft and clutch members upwardly axially of said shaft upon gyratory movement of the latter, and tending to bring said basket shaft and clutch members to normal position by downward movement axially of said shaft.

3. A centrifugal machine including in combination a basket, a basket shaft supported at its bottom and having longitudinal movement, a motor including a shaft normally in alinement with the basket shaft, and a drive mechanism located at the top end of the basket shaft and including a member connected to the motor shaft, a member connected to the basket shaft, and a centrifugally operated friction member between said shafts.

4. A centrifugal machine including in combination a basket, a basket shaft supported at its bottom end and having longitudinal and gyratory movement, a motor, a drive connection from the motor to the shaft, said drive including a member connected to the motor, a member connected to the shaft at a point separated from its center of gyration, and a centrifugally operated friction member between said motor member and said shaft member.

5. A centrifugal machine including in combination a basket, a shaft therefor, concave bearing means at the lower end of the shaft for supporting the weight of the basket and shaft, said bearing means permitting gyration of the shaft and basket, means for supporting the upper end of the basket shaft for permitting oscillating and longitudinal movement thereof, a motor having its shaft normally in alinement with the basket shaft, and a centrifugal clutch cooperating with the motor and basket shafts and permitting the described movements of the basket shaft.

6. A centrifugal machine including in combination a basket, a basket shaft supported at its bottom end in a universal step-bearing which creates longitudinal and gyratory movement of the shaft, a ball and socket bearing encircling the shaft near the upper end thereof and within which the shaft has relative longitudinal movement, the center of the ball and socket bearing being substantially at the center of gyration of the basket, a driven element of a centrifugal clutch fixed on the shaft immediately above said center of gyration, a motor mounted above the basket shaft, and the driving elements of a centrifugal clutch mounted on the motor shaft, the driving and driven elements of said clutch being designed to permit longitudinal movement of the basket shaft.

In testimony whereof, I have signed my name to this specification.

TANDY A. BRYSON.